United States Patent
Pursifull et al.

(10) Patent No.: US 11,035,316 B1
(45) Date of Patent: Jun. 15, 2021

(54) SYSTEM AND METHOD FOR INJECTING FUEL TO AN ENGINE

(71) Applicant: Ford Global Technologies, LLC, Dearborn, MI (US)

(72) Inventors: Ross Pursifull, Dearborn, MI (US); Jonathan Mark Roberts, Livonia, MI (US); Joseph Lyle Thomas, Farmington Hills, MI (US); Paul Hollar, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/835,654

(22) Filed: Mar. 31, 2020

(51) Int. Cl.
*B60T 7/12* (2006.01)
*F02D 41/40* (2006.01)
*F02M 69/46* (2006.01)

(52) U.S. Cl.
CPC ......... *F02D 41/401* (2013.01); *F02M 69/465* (2013.01); *F02D 2200/0602* (2013.01); *F02D 2200/101* (2013.01)

(58) Field of Classification Search
CPC .......... F02D 1/16; F02D 41/061; F02D 41/34; F02D 41/345; F02D 41/365; F02D 41/40; F02D 41/401; F02D 2001/0085; F02D 2200/0618

USPC .................. 701/103, 105; 123/434, 435, 457
See application file for complete search history.

(56) References Cited

U.S. PATENT DOCUMENTS

| | | | |
|---|---|---|---|
| 6,850,836 B1 * | 2/2005 | Scholl | G01M 15/12 701/115 |
| 7,938,101 B2 | 5/2011 | Cinpinski et al. | |
| 9,482,176 B2 * | 11/2016 | Pursifull | F02D 41/0002 |
| 2012/0143477 A1 * | 6/2012 | Ruona | F02D 35/024 701/103 |
| 2012/0160221 A1 * | 6/2012 | Munshi | F02M 21/0206 123/575 |
| 2015/0081195 A1 | 3/2015 | Berkemeier et al. | |
| 2016/0076504 A1 * | 3/2016 | Anandhan | F02M 59/20 123/456 |
| 2018/0238260 A1 | 8/2018 | Seegmüller et al. | |

* cited by examiner

*Primary Examiner* — John Kwon
(74) *Attorney, Agent, or Firm* — Geoffrey Brumbaugh; McCoy Russell LLP (57) ABSTRACT

Methods and systems for adjusting timing of fuel injectors to reduce cylinder to cylinder air-fuel maldistribution are disclosed. In one example, fuel injection timing is adjusted as a function of pressure ratios that are based on fuel rail pressures observed during injection of fuel. The pressure ratio may be a ratio of a root-mean-square pressure and a scheduling fuel pressure.

20 Claims, 5 Drawing Sheets

SYSTEM AND METHOD FOR INJECTING FUEL TO AN ENGINE

FIELD

The present description relates to injecting fuel to an engine. In one example, pressure in a fuel rail is monitored while fuel is injected to an engine so that fuel injection timings for subsequent fuel injections may compensate pressure changes in the fuel rail. The approach may be particularly useful to remove cylinder to cylinder fuel maldistribution.

BACKGROUND/SUMMARY

A fuel injection system may include a fuel rail that supplies fuel to a plurality of fuel injectors. Fuel that is in the fuel rail may be pressurized so that fuel may be injected into an intake port of a cylinder or directly into a cylinder. The pressure of fuel in the fuel rail may change from engine cycle to engine cycle due to fuel entering the fuel rail and fuel exiting the fuel rail. In particular, pressure in the fuel rail may increase when a fuel pump pushes fuel into the fuel rail and pressure in the fuel rail may decrease when one or more fuel injectors open. Pressure in the fuel rail may also change due to the natural response of the fuel rail. If fuel is injected when pressure in the fuel rail is higher or lower than may be expected, an amount of fuel injected may not be a requested amount of fuel to be injected. Cylinder to cylinder air-fuel ratio maldistribution may be the result of injecting fuel when pressure in the fuel rail is not an expected pressure. The cylinder to cylinder air-fuel maldistribution may increase engine emissions.

The inventors herein have recognized the above-mentioned fuel injection issue and have developed a method for supplying fuel to an engine, comprising: each time fuel is injected to an engine during an engine cycle, sampling pressure in a fuel rail a plurality of times while a fuel injector supplying fuel to a cylinder via the fuel rail is open; and adjusting timing of a subsequent fuel injection in response to compensation factor that is generated from sampling pressure in the fuel rail the plurality of times.

By sampling fuel injection pressures at times when fuel injectors are open, it may be possible to a generate compensation factors that may remove at least a portion of cylinder to cylinder air-fuel maldistribution. In addition, the fuel injection pressures may be indicative of the presence or absence of fuel injector degradation. As such, it may be desirable to sample fuel rail pressure at a high rate of speed to improve engine air-fuel control and fuel system diagnostics.

The present description may provide several advantages. Specifically, the approach may reduce engine air-fuel maldistribution between engine cylinders. Further, the approach may reduce engine emissions. Further still, the approach may make it possible to apply smaller volume catalysts to reduce engine emissions. The approach may also be useful to improve fuel system diagnostics.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
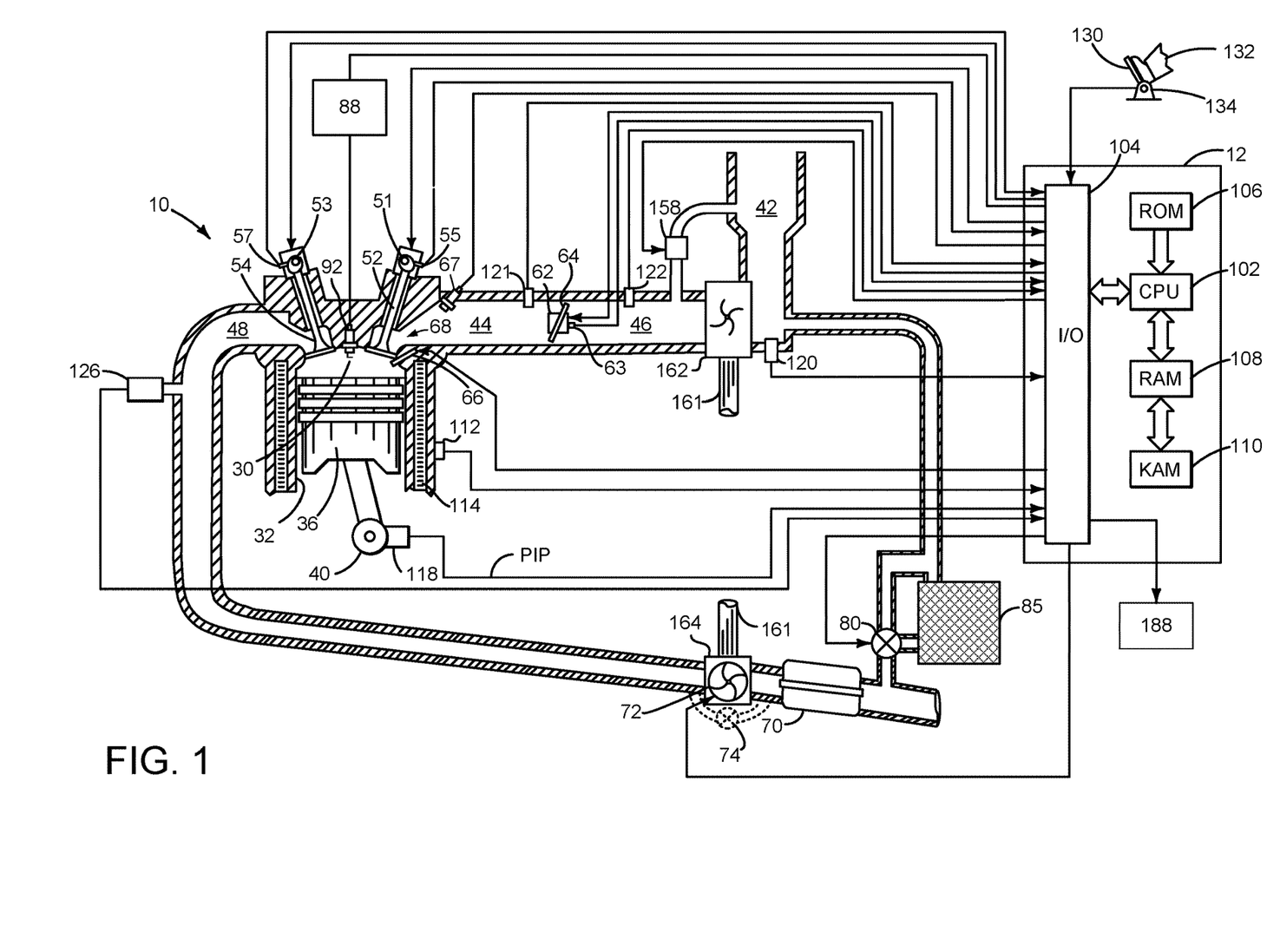
FIG. 1 shows a schematic depiction of an engine.
Figure 2:
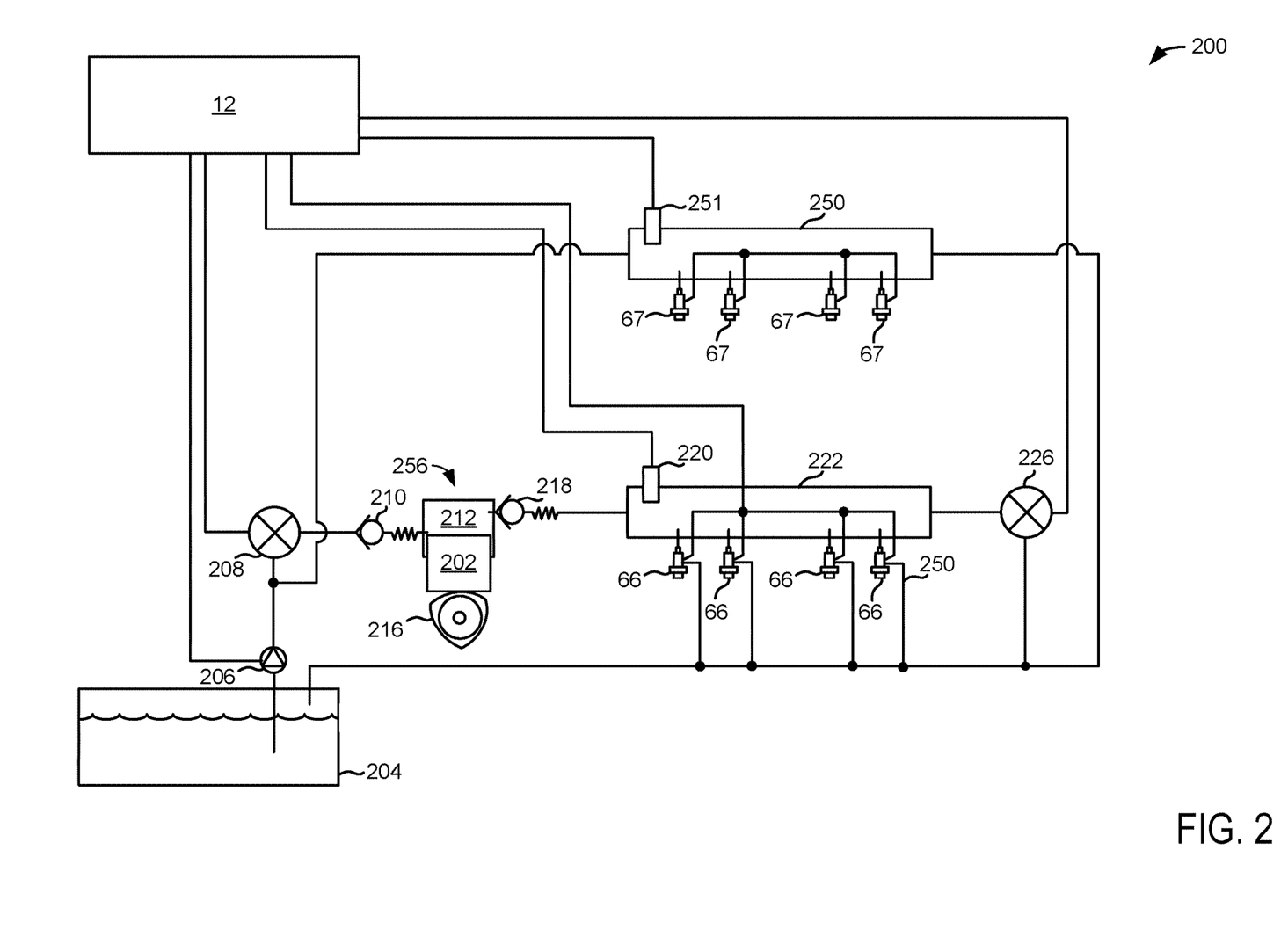
FIG. 2 shows a detailed depiction of a fuel system that supplies fuel to the engine.
Figure 3:
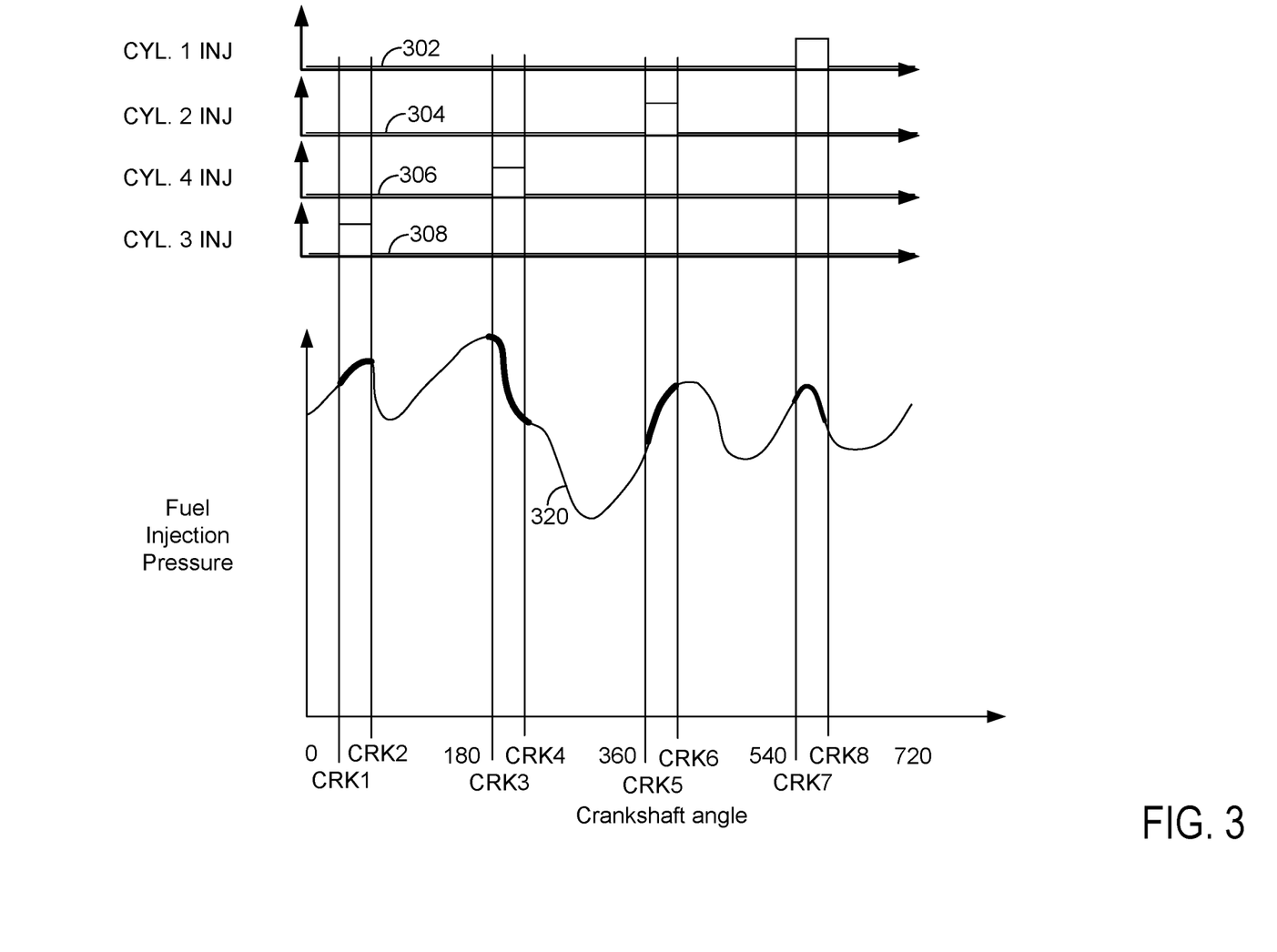
FIG. 3 shows a plot of when fuel rail pressure may be sampled at high speed to improve engine operation.

The present description is related to reducing cylinder to cylinder air-fuel ratio maldistributions that may be due to standing pressure waves that may occur within a fuel rail. Fuel rail pressure may be sampled at a high rate of speed (e.g., 100 kilo-Hertz) so that operating conditions of a fuel system may be monitored. FIG. 1 shows one example of an engine; however, the systems and method disclosed herein are also applicable to compression ignition engines. Sampling of the fuel rail pressure may include converting fuel pressures in the fuel rail into voltage via a sensor and converting the voltages into digital numbers at predetermined time intervals via an analog to digital (A/D) converter within a controller. The engine may include a fuel system as is shown in FIG. 2. Fuel rail pressure may be sampled at specific engine crankshaft intervals or times within an engine crankshaft interval as shown in FIG. 3. Fuel injector degradation may be evaluated based on fuel injector opening delay and/or fuel injector closing delay as shown in FIG. 3. The method of FIG. 5 adjusts fuel injection timing to adjust amounts of fuel injected into an engine. Further, the method of FIG. 5 evaluates the presence or absence of fuel injector degradation according to fuel injector opening and closing delay times.

Referring now to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal from controller 12. Fuel is delivered to fuel injector 66 by a fuel system as shown in FIG. 2. Fuel pressure delivered by the fuel pump may be adjusted by varying an inlet metering valve regulating flow to a fuel pump (not shown) and a fuel rail pressure control valve. In some examples, a second port fuel injector 67 may inject fuel to intake port 68.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine temperature from temperature sensor 112; a position sensor 134 coupled to an accelerator pedal 130 for sensing force applied by human foot 132; a measurement of engine manifold pressure (MAP) from pressure sensor 121 coupled to intake manifold 44; an engine position sensor from a Hall effect sensor 118 sensing crankshaft 40 position; a measurement of air mass entering the engine from sensor 120; and a measurement of throttle position from sensor 63. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller may send information and notifications to human/machine interface 188. In addition, human/machine interface 188 may receive input to operate engine 10 and/or a vehicle. Human/machine interface may be a touch screen or other known human/machine interface.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a detailed depiction of a fuel system that supplies fuel an engine is shown. The fuel system of FIG. 2 may be monitored in the engine system of FIG. 1 via the method of FIG. 5.

Fuel system 200 includes various valves and pumps that are controlled by controller 12. Fuel pressure in fuel rail 222 is sensed via pressure sensor 220. Controller 12 controls pressure in fuel rail 222 using pressure feedback from pressure sensor 220. Controller 12 activates low pressure fuel pump 206 to supply fuel to fuel pump flow metering valve 208 and optional port fuel injectors 67. Check valve 210 allows fuel to flow to high pressure fuel pump 256 and it limits back fuel flow from high pressure fuel pump 256. Fuel pump flow metering valve 208 controls the amount of fuel entering high pressure fuel pump 256. Cam 216 is driven by the engine and provides motive force to piston 202 which operates on fuel in pump chamber 212.

High pressure fuel pump 256 directs fuel to fuel injector rail 222 via check valve 218. Fuel pressure in fuel rail 222 may be controlled via adjusting valves 208 and 226. Fuel rail pressure control valve 226 may be positioned partially open during operating conditions such that at least a portion of fuel supplied by fuel pump 256 returns to fuel tank 204. Fuel rail pressure control valves 226 may be at least partially opened an additional amount during some conditions to reduce fuel pressure in the fuel rail 222. Fuel rail pressure control valve 226 may be at least partially closed during some conditions to increase fuel pressure in fuel rail 222.

Fuel rail 222 may provide fuel to one cylinder bank of an engine via direct fuel injectors 66. Fuel rail pressure control valve 226 may be controlled separately from fuel pump flow metering valve 208 so that fuel pressure in fuel rail 222 may be adjusted by whichever valve or combination of valves provides a desired fuel pressure response.

Low pressure fuel pump 206 also supplies fuel to fuel rail 250. Port fuel injectors 67 are supplied fuel via fuel rail 250. Pressure in fuel rail 250 may be determined via pressure sensor 251. Fuel that is not injected during an engine cycle may be returned to fuel tank 204.

Thus, the system of FIGS. 1 and 2 provides for an engine system, comprising: a plurality of cylinders; a fuel rail; a plurality of fuel injectors in fluidic communication with the fuel rail and the plurality of cylinders; and a controller including executable instructions stored in a non-transitory memory that cause the controller to adjust timing of the plurality of fuel injectors in response to root-mean-square values of fuel pressures, each of the fuel pressures sampled only when one of the plurality of fuel injectors is open. The engine system further comprises additional instructions that cause the controller to estimate a fuel injector opening delay based on the fuel pressures. The engine system further comprises additional instructions that cause the controller to determine a presence or absence of fuel injector degradation in response to the fuel injector opening delay. The engine system further comprises additional instructions that cause the controller to estimate a fuel injector closing delay based on the fuel pressures. The engine system further comprises additional instructions that cause the controller to determine compensation factors based on the root-mean square values of fuel pressures. The engine system includes where the compensation factors are based on a ratio of pressures. The engine system includes where the ratio of pressures include a scheduling pressure.

Referring now to FIG. 3, a plot of an example simulated fuel rail fuel pressure sampling sequence during an engine cycle is shown. The sequence of FIG. 3 may be provided via controller 12 executing instructions according to the method shown in FIG. 5. Vertical markers at CRK1-8 show fuel rail fuel pressure sampling windows in the sequence.

FIG. 3 includes five plots and each of the five plots includes a horizontal axis that represents engine crankshaft angle. A crankshaft angle of zero corresponds to top-dead-center compression stroke for cylinder number one. The duration of each plot is one engine cycle of a four stroke engine (e.g., 720 crankshaft degrees). The plots are aligned in the crankshaft angle domain.

The first plot from the top of FIG. 3 is a plot of a fuel injector control command for a fuel injector that supplies fuel to cylinder number one. This fuel injector is indicated as cylinder number one injector. The fuel injector for cylinder number one is off or closed (e.g., not allowing fuel to flow from the injector to the cylinder) when trace 302 is at a lower level near the horizontal axis. The fuel injector for cylinder number one is on or open (e.g., allowing fuel to flow from the injector to the cylinder) when trace 302 is at a higher level near the vertical axis arrow. The horizontal axis represents engine position relative to top-dead-center compression stroke of cylinder number one. The vertical axis represents the level of the command that is delivered to the fuel injector of cylinder number one. Trace 302 represents the command for the fuel injector of cylinder number one.

The second plot from the top of FIG. 3 is a plot of a fuel injector control command for a fuel injector that supplies fuel to cylinder number two. This fuel injector is indicated as cylinder number two injector. The fuel injector for cylinder number two is off or closed (e.g., not allowing fuel to flow from the injector to the cylinder) when trace 304 is at a lower level near the horizontal axis. The fuel injector for cylinder number two is on or open (e.g., allowing fuel to flow from the injector to the cylinder) when trace 304 is at a higher level near the vertical axis arrow. The horizontal axis represents engine position relative to top-dead-center compression stroke of cylinder number two. The vertical axis represents the level of the command that is delivered to the fuel injector of cylinder number two. Trace 304 represents the command for the fuel injector of cylinder number two.

The third plot from the top of FIG. 3 is a plot of a fuel injector control command for a fuel injector that supplies fuel to cylinder number four. This fuel injector is indicated as cylinder number four injector. The fuel injector for cylinder number four is off or closed (e.g., not allowing fuel to flow from the injector to the cylinder) when trace 306 is at a lower level near the horizontal axis. The fuel injector for cylinder number four is on or open (e.g., allowing fuel to flow from the injector to the cylinder) when trace 306 is at a higher level near the vertical axis arrow. The horizontal axis represents engine position relative to top-dead-center compression stroke of cylinder number four. The vertical axis represents the level of the command that is delivered to the fuel injector of cylinder number four. Trace 306 represents the command for the fuel injector of cylinder number four.

The fourth plot from the top of FIG. 3 is a plot of a fuel injector control command for a fuel injector that supplies fuel to cylinder number three. This fuel injector is indicated as cylinder number three injector. The fuel injector for cylinder number three is off or closed (e.g., not allowing fuel to flow from the injector to the cylinder) when trace 308 is at a lower level near the horizontal axis. The fuel injector for cylinder number three is on or open (e.g., allowing fuel to flow from the injector to the cylinder) when trace 308 is at a higher level near the vertical axis arrow. The horizontal axis represents engine position relative to top-dead-center compression stroke of cylinder number three. The vertical axis represents the level of the command that is delivered to the fuel injector of cylinder number three. Trace 308 represents the command for the fuel injector of cylinder number three.

The fifth plot from the top of FIG. 3 is a plot of fuel pressure in a fuel injection rail that supplies fuel to the fuel injectors of cylinders one through four versus engine crankshaft angle. The vertical axis represents fuel pressure in the fuel rail and fuel pressure increases in the direction of the vertical axis arrow. The horizontal axis represents engine position relative to top-dead-center compression stroke of cylinder number one (e.g., zero crankshaft degrees). Trace 320 represents the fuel pressure that is in the fuel rail. In this example, trace 320 shows a standing fuel pressure wave that repeats each engine cycle when the engine is operating at a constant engine speed and engine load.

At crankshaft angle CRK1, the fuel injector for cylinder number three is commanded open. The fuel injector for cylinder number three is commanded open during an intake stroke of cylinder number three. The fuel injector for cylinder number three is commanded closed at crankshaft angle CRK2. Pressure in the fuel rail may be sampled starting at a predetermined amount of time (e.g., 10 milliseconds) before or advanced of the time that the third fuel injector is commanded open (e.g., crankshaft angle CRK1). The fuel rail pressure sampling may continue for a predetermined amount of time (e.g., 30 milliseconds) after or retarded from the time that the third fuel injector is commanded closed (e.g., crankshaft angle CRK2). The fuel rail pressure is sampled at a high frequency (e.g., 100 kilo-Hertz) during this time and crankshaft interval. Sampling of fuel rail pressure may be stopped the predetermined amount of time after the third fuel injector is commanded off to conserve memory and reduce data processing effort. Sampling the fuel rail fuel pressure while the fuel injector that supplies fuel to cylinder number three is open allows the controller to determine a fuel pressure at which fuel was injected to cylinder number three.

At crankshaft angle CRK3, the fuel injector for cylinder number four is commanded open. The fuel injector for cylinder number four is commanded open during an intake stroke of cylinder number four. The fuel injector for cylinder number four is commanded closed at crankshaft angle CRK4. Pressure in the fuel rail may be sampled starting at a predetermined amount of time (e.g., 10 milliseconds) before or advanced of the time that the fourth fuel injector is commanded open (e.g., crankshaft angle CRK3). The fuel rail pressure sampling may continue for a predetermined amount of time (e.g., 30 milliseconds) after or retarded from the time that the fourth fuel injector is commanded closed (e.g., crankshaft angle CRK4). The fuel rail pressure is sampled at a high frequency (e.g., 100 kilo-Hertz) during this time and crankshaft interval. Sampling of fuel rail pressure may be stopped the predetermined amount of time after the fourth fuel injector is commanded off to conserve memory and reduce data processing effort. Sampling the fuel rail fuel pressure while the fuel injector that supplies fuel to cylinder number four is open allows the controller to determine a fuel pressure at which fuel was injected to cylinder number four.

At crankshaft angle CRK5, the fuel injector for cylinder number two is commanded open. The fuel injector for cylinder number two is commanded open during an intake stroke of cylinder number two. The fuel injector for cylinder number two is commanded closed at crankshaft angle CRK6. Pressure in the fuel rail may be sampled starting at a predetermined amount of time (e.g., 10 milliseconds) before or advanced of the time that the second fuel injector is commanded open (e.g., crankshaft angle CRK5). The fuel rail pressure sampling may continue for a predetermined amount of time (e.g., 30 milliseconds) after or retarded from the time that the second fuel injector is commanded closed (e.g., crankshaft angle CRK6). The fuel rail pressure is sampled at a high frequency (e.g., 100 kilo-Hertz) during this time and crankshaft interval. Sampling of fuel rail pressure may be stopped the predetermined amount of time after the second fuel injector is commanded off to conserve memory and reduce data processing effort. Sampling the fuel rail fuel pressure while the fuel injector that supplies fuel to cylinder number two is open allows the controller to determine a fuel pressure at which fuel was injected to cylinder number two.

At crankshaft angle CRK7 the fuel injector for cylinder number one is commanded open. The fuel injector for cylinder number one is commanded open during an intake stroke of cylinder number one. The fuel injector for cylinder number one is commanded closed at crankshaft angle CRK7. Pressure in the fuel rail may be sampled starting at a predetermined amount of time (e.g., 10 milliseconds) before or advanced of the time that the first fuel injector is commanded open (e.g., crankshaft angle CRK7). The fuel rail pressure sampling may continue for a predetermined amount of time (e.g., 30 milliseconds) after or retarded from the time that the first fuel injector is commanded closed (e.g., crankshaft angle CRK8). The fuel rail pressure is sampled at a high frequency (e.g., 100 kilo-Hertz) during this time and crankshaft interval. Sampling of fuel rail pressure may be stopped the predetermined amount of time after the first fuel injector is commanded off to conserve memory and reduce data processing effort. Sampling the fuel rail fuel pressure while the fuel injector that supplies fuel to cylinder number one is open allows the controller to determine a fuel pressure at which fuel was injected to cylinder number one.

Figure 4:
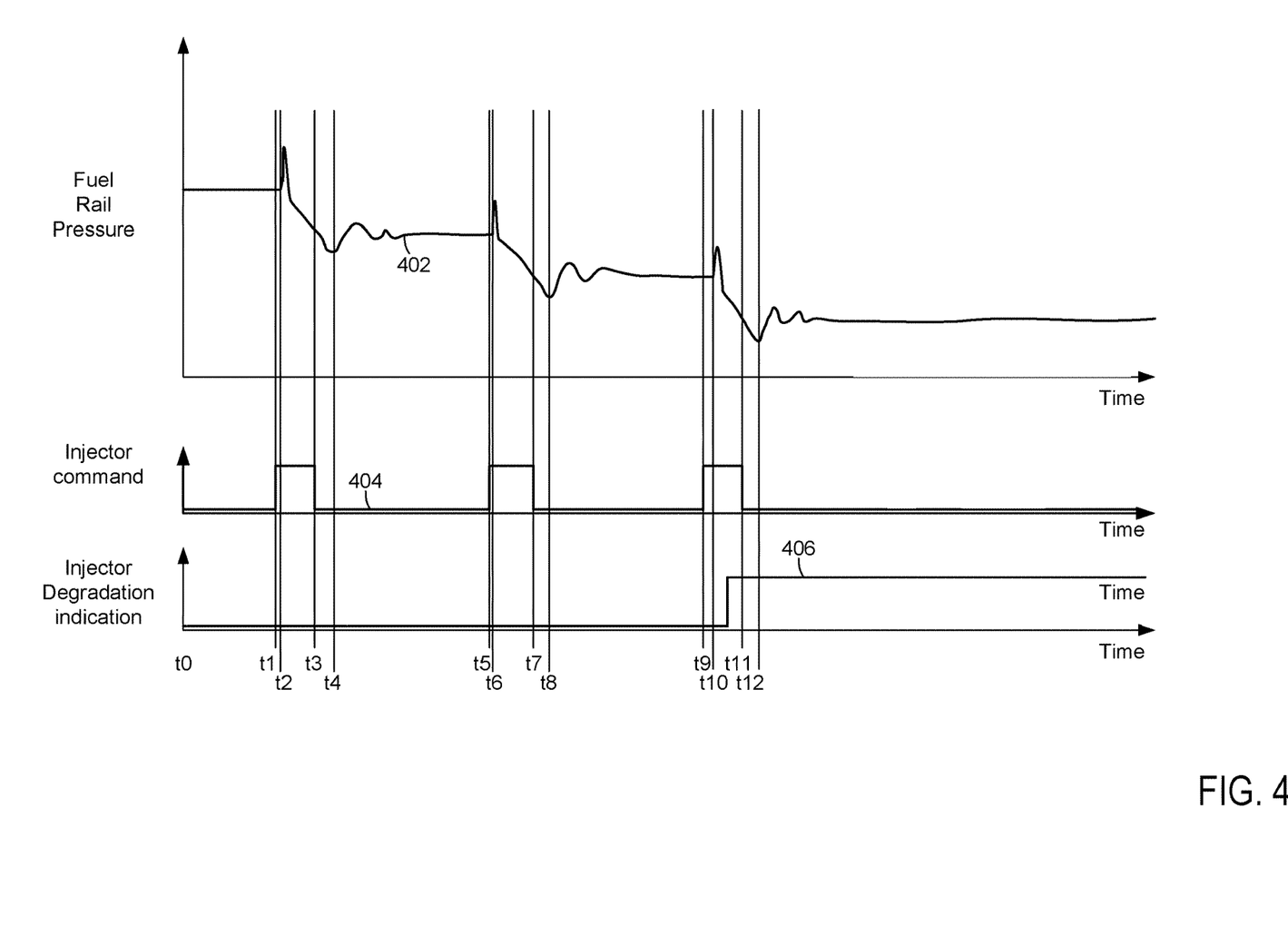
FIG. 4 shows a plot of an example fuel injection sequence where fuel injector degradation may be evaluated.

In this way, sampling of fuel pressure in a fuel rail may be based on opening and closing times of a cylinder's fuel injectors. Sampling and determining fuel pressures in this way may reduce a computational load that is placed on a controller to determine air-fuel ratio maldistribution between engine cylinders. Further, by sampling fuel pressure in a fuel rail when fuel injectors of the fuel rail are open, fuel rail fuel pressure may be a basis for determining how fuel injection amounts may be influenced by fuel rail fuel pressure. Referring now to FIG. 4, a plot of an example simulated fuel injector degradation determining sequence is shown. The sequence of FIG. 4 may be provided via controller 12 executing instructions according to the method shown in FIG. 5. Vertical markers at times t0-t16 indicate times of interest during the sequence.

FIG. 4 includes three plots and each of the three plots includes a horizontal axis that represents time. Time increases from the left side of the plots to the right side of the plots. The plots are aligned in time.

The first plot from the top of FIG. 4 is a plot of fuel pressure in a fuel rail or fuel rail fuel pressure versus time. The vertical axis represents fuel pressure in the fuel rail and fuel pressure increases in the direction of the vertical axis arrow. The horizontal axis represents time and time increases from the left hand side of the plot to the right hand side of the plot. Trace 402 represents the fuel pressure in the fuel rail.

The second plot from the top of FIG. 4 is a plot of a fuel injector control commands for engine cylinders versus time. The fuel injectors are off or closed (e.g., not allowing fuel to flow from the injectors to the cylinders) when trace 404 is at a lower level near the horizontal axis. The one of the engine's fuel injectors is open (e.g., allowing fuel to flow from the injector to the cylinder) when trace 404 is at a higher level near the vertical axis arrow. The horizontal axis represents time and time increases from the left hand side of the plot to the right hand side of the plot. Trace 404 represents commands to the fuel injectors.

The third plot from the top of FIG. 4 is a plot of a fuel injector degradation indicating state versus time. The vertical axis represents a state of a fuel injector degradation indicating state. Fuel injector degradation is indicated when trace 406 is at a higher level near the vertical axis arrow. Fuel injector degradation is not indicated when trace 406 is at a lower level near the horizontal axis. Trace 404 represents the fuel injector degradation state level.

In this example, pressure in a fuel rail is commanded to a higher level and then the fuel pump is deactivated so that additional fuel is not pumped to the fuel rail. One or more injectors are then opened and closed so that pressure in the fuel rail is reduced each time a fuel injector is opened. However, the present method does not necessarily require operating the fuel system in this way to determine fuel injector degradation. Rather, the present method described in FIG. 4 determines the presence or absence of fuel injector degradation according to fuel injector opening or closing delay times.

At time t0, pressure in the fuel rail is high and the fuel pump (not shown) is commanded not to replenish fuel in the fuel rail. The fuel injectors are not commanded on and fuel injector degradation is not indicated.

At time t1, only one fuel injector (e.g., the fuel injector for cylinder number one) is commanded open. The fuel rail pressure is unchanged from time t0 and fuel injector degradation is not indicated. The pressure in the fuel rail increases at time t2 by more than a threshold amount of pressure since the fuel injector was commanded open at time t1. This indicates that the fuel injector is now open. The fuel pressure increases when the fuel injector opens because in the open position the inward opening injector reduces the trapped volume in the fuel rail, thus initialing compressing the existing trapped liquid fuel. Part of the height of the peak following t2 is due to a transient pressure pulse as the opening injector sends out a positive pressure pulse. The fuel injection opening delay time for the one fuel injector that was commanded open at time t1 may be estimated by determining the time difference between time t1 and time t2. The fuel injector opening delay time is determined to be less than a threshold amount of time at this time so degradation of the fuel injector supplying fuel to cylinder number one is not indicated. The fuel pressure in the fuel rail 402 drops shortly after time t2 as fuel is released from the fuel rail and into the engine.

The fuel injector for cylinder number one is commanded closed at time t3 and fuel pressure in the fuel rail increases at time t4 by more than a threshold amount since the fuel injector was commanded closed at time t3. This indicates that the fuel injector is now closed. The fuel pressure decreases after the fuel injector closes partially due to the water hammer effect (transient) but also due the inward-opening injector closing and thus increasing the volume of liquid fuel trapped behind the fuel injectors. The t2 upgoing spike occurs at injector opening. The t3 down going peak occurs after injector closing. Thus while t2-t1 is opening time, t4 minus t3 it closing time plus a time period where the rarefication transient forms. The signal processing differs between the narrow, well-defined pressure spike on opening and the spike on closing where only the peak is clearly locatable. The fuel injection closing delay time for the fuel injector of cylinder number one may be estimated by determining the time difference between time t3 and time t4. The fuel injector closing delay time is determined to be less than a threshold amount of time at this time so degradation of the fuel injector supplying fuel to cylinder number one is not indicated.

At time t5, only one fuel injector (e.g., the fuel injector for cylinder number three) is commanded open. The fuel rail pressure is steady and fuel injector degradation is not indicated. The pressure in the fuel rail increases at time t6 by more than a threshold amount of pressure since the fuel injector was commanded open at time t5. This indicates that the fuel injector is now open. The fuel injection opening delay time for the one fuel injector that was commanded open at time t5 may be estimated by determining the time difference between time t5 and time t6. The fuel injector opening delay time is determined to be less than a threshold amount of time at this time so degradation of the fuel injector supplying fuel to cylinder number three is not indicated. The fuel pressure in the fuel rail 402 drops shortly after time t6 as fuel is released from the fuel rail and into the engine.

The fuel injector for cylinder number three is commanded closed at time t7 and fuel pressure in the fuel rail increases at time t8 by more than a threshold amount since the fuel injector was commanded closed at time t7. This indicates that the fuel injector is now closed. The fuel injection closing delay time for the fuel injector of cylinder number three may be estimated by determining the time difference between time t7 and time t8. The fuel injector closing delay time is determined to be less than a threshold amount of time so degradation of the fuel injector supplying fuel to cylinder number three is not indicated.

At time t9, only one fuel injector (e.g., the fuel injector for cylinder number four) is commanded open. The fuel rail pressure is steady and fuel injector degradation is not indicated. The pressure in the fuel rail increases at time t10 by more than a threshold amount of pressure since the fuel injector was commanded open at time t9. This indicates that the fuel injector is now open. The fuel injection opening delay time for the one fuel injector that was commanded open at time t9 may be estimated by determining the time difference between time t9 and time t10. The fuel injector opening delay time is determined to be greater than a threshold amount of time at this time so degradation of the fuel injector supplying fuel to cylinder number four is indicated. The fuel pressure in the fuel rail 402 drops shortly after time t10 as fuel is released from the fuel rail and into the engine.

The fuel injector for cylinder number four is commanded closed at time t11 and fuel pressure in the fuel rail increases at time t12 by more than a threshold amount since the fuel injector was commanded closed at time tn. This indicates that the fuel injector is now closed. The fuel injection closing delay time for the fuel injector of cylinder number four may be estimated by determining the time difference between time t11 and time t12. The fuel injector closing delay time is determined to be less than a threshold amount of time at this time; however, degradation of the fuel injector is already indicated so fuel injector degradation continues to be indicated.

In this way, fuel injector opening delay timing may be a basis for determining the presence or absence of fuel injector degradation. A fuel injector opening or closing delay time that is longer than a threshold amount of time may be indicative of a sticky or otherwise degraded injector that may inconsistently inject a commanded amount of fuel.

Figure 5:
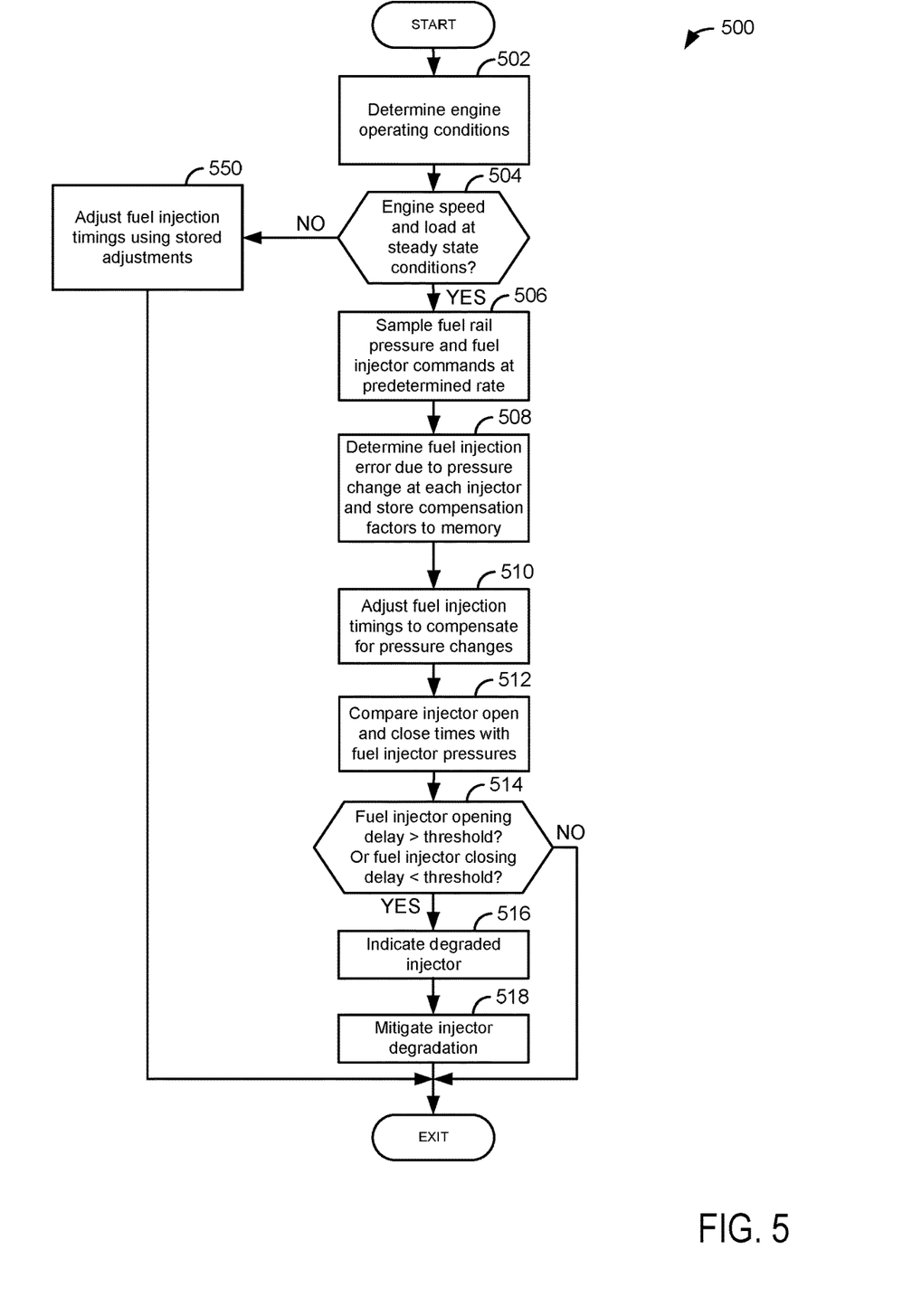
FIG. 5 shows flow chart of an example method for improving engine air-fuel ratio control and evaluating a fuel system for fuel injector degradation.

Referring now to FIG. 5, a flow chart of a method for improving engine air-fuel ratio control and evaluating a fuel system for fuel injector degradation is shown. The method of FIG. 5 may be stored as executable instructions in non-transitory memory in systems such as shown in FIG. 1. The method of FIG. 5 may be incorporated into and may cooperate with the systems of FIGS. 1 and 2. Further, at least portions of the method of FIG. 5 may be incorporated as executable instructions stored in non-transitory memory while other portions of the method may be performed via a controller transforming operating states of devices and actuators in the physical world. The controller may employ actuators of the vehicle system to adjust vehicle operation, according to the method described below. Further, method 500 may determine selected engine and/or vehicle control parameters from sensor inputs.

At 502, method 500 determines engine operating conditions. Engine operating conditions may include but are not limited to engine speed, engine load, engine torque command, fuel pressure, fuel temperature, ambient pressure, and ambient temperature. Method 500 proceeds to 504 after operating conditions are determined.

At 504, method 500 judges whether or not operating conditions are present to determine compensation factors for standing pressure waves in the fuel rail. In one example, conditions for determining compensation factors for standing pressure waves in the fuel pressure rail may be present when engine speed is changing less than a threshold amount (e.g., Less than 300 RPM/second) and when engine load, or alternatively, fuel injection amount is changing by less than a threshold amount (e.g., less than 0.4 load/second or less than 15% of an injected fuel mass). If method 500 judges that conditions are present to determine compensation factors for standing pressure waves in the fuel rail, the answer is yes and method 500 proceeds to 506. Otherwise, the answer is no and method 500 proceeds to 550.

At 550, method modifies the amounts of fuel injected to engine cylinders by multiplying a base fuel amount (e.g., an amount of fuel injected to the engine as determined from engine speed and driver demand torque or engine load) by compensation factors determined at 508 to reduce fueling errors that may be due to standing pressure waves in the fuel rail. For example, if a requested fuel mass to inject to a cylinder number one is X grams, then the X grams may be multiplied by a value of a compensation factor for cylinder number one (e.g., 1.005) to reduce cylinder to cylinder air-fuel ratio maldistribution. If the requested fuel mass to inject to cylinder number two is Y grams, then the Y grams may be multiplied by a value of a compensation factor for cylinder number two (1.013) to reduce cylinder to cylinder air-fuel ratio maldistribution. Likewise, the amounts of fuel injected into the engine's other cylinders may be adjusted in a similar way. Method 500 proceeds to exit.

At 506, method 500 samples fuel pressure in a fuel rail at a predetermined rate. Method 500 may also sample output commands to fuel injectors at the predetermined rate, or alternatively, fuel injector command values may be stored in controller random access memory. In one example, sampling fuel pressure according to method 500 includes converting pressure in a fuel rail to a voltage, the voltage is converted into a digital number via an A/D converter and stored in controller random access memory. As time changes, the voltage may be converted to a digital number at a predetermined frequency (e.g., sampling frequency of 100 kilo-Hertz) and stored to controller random access memory. Likewise, voltage of fuel injector commands of values of fuel injector commands may be stored as numbers in controller random access memory. Method 500 may begin converting fuel rail pressures to digital numbers a predetermined amount of time before each fuel injector is commanded open as mentioned in the description of FIG. 3. Further, method 500 may stop converting fuel rail pressures to digital numbers after beginning to convert the fuel rail pressures to digital numbers a predetermined amount of time after each fuel injection is commanded closed as mentioned in the description of FIG. 3. Thus, for sampling fuel pressure in a fuel rail while the fuel injector of cylinder number one is injecting fuel may begin a predetermined amount of time before the fuel injector for cylinder number one is commanded opened. The sampling of fuel pressure in the fuel rail while the fuel injector of cylinder number one is injecting fuel may end during a same engine cycle a predetermined amount of time after the fuel injector for cylinder number one is commanded closed. Sampling of fuel in the fuel rail for other engine cylinders may be performed in a similar way. Likewise, sampling of the fuel injector command signals may be performed in a similar way. Method 500 proceeds to 508.

At 508, method 500 determines fuel injection amount errors that are due to fuel pressure changes during fuel injection. The fuel injection amount errors may be due to standing pressure waves that may occur in the fuel rail as shown in FIG. 3.

Method 500 determines root mean square (RMS) values for fuel rail fuel pressures that were collected during fuel rail pressure sampling for a fuel injection event. A square root value may be determined from each fuel rail fuel pressure value that was sampled and stored to controller memory beginning a predetermined amount of time before fuel injection to cylinder number one was commanded on during an engine cycle and ending a predetermined amount of time after fuel injection to cylinder number one was commanded off during the engine cycle. Square root values for the engine's other cylinders are also determined. The average of these square root values for each cylinder is determined and it is squared. This operation may be described as follows, where five pressure samples are shown for the sake of brevity:

$$RMS = \left[ \frac{\sqrt{P1} + \sqrt{P2} + \sqrt{P3} + \sqrt{P4} + \sqrt{P5}}{N} \right]^2$$

where RMS is a root mean square fuel rail fuel pressure that was observed during injection of fuel to a cylinder (e.g., cylinder number one), P1 is fuel rail fuel pressure taken at a first time during injection of fuel to the cylinder, P2 is fuel rail fuel pressure taken at a second time during injection of fuel to the cylinder, P3 is fuel rail fuel pressure taken at a third time during injection of fuel to the cylinder, P4 is fuel rail fuel pressure taken at a fourth time during injection of fuel to the cylinder, P5 is fuel rail fuel pressure taken at a fifth time during injection of fuel to the cylinder, N is the number of fuel rail fuel pressures sampled or take for the injection of fuel to the cylinder during the engine cycle, N=5 in this example. Alternatively, instead of determining RMS pressure values for each cylinder, an average fuel rail fuel pressure value for each cylinder may be determined (e.g., (P1+P2+P3+P4+P5)/5).

Method 500 determines a mass ratio for each cylinder during the engine cycle from the RMS or average fuel rail fuel pressure values for each cylinder. The mass ratio may be expressed as a square root of an RMS fuel injection pressure or average fuel injection pressure divided by a scheduling fuel pressure. The scheduling fuel pressure is a fuel pressure that is expected in a fuel rail at a future time when the fuel is being injected to a cylinder. It may be expected that the fuel rail pressure will not change much over a predetermined time interval or crankshaft rotation interval so that a present fuel pressure that is in the fuel rail is expected to be the fuel rail fuel pressure at a time in the future when the fuel is being injected to the engine. Consequently, a present fuel rail fuel pressure may be determined to be a scheduling fuel pressure. As such, the fuel injection opening timing is scheduled according to the scheduling fuel rail pressure that is determined before the fuel is injected to the cylinder and the requested amount of fuel. The mass ratios for a four cylinder engine may be determined as follows:

$$MR1 = \sqrt{\frac{RMS1}{SP1}} \quad MR2 = \sqrt{\frac{RMS2}{SP2}}$$

$$MR3 = \sqrt{\frac{RMS3}{SP3}} \quad MR4 = \sqrt{\frac{RMS4}{SP4}}$$

where MR1 is the mass ratio for cylinder number one, RMS1 is the RMS fuel rail fuel pressure for injection of fuel into cylinder number one, SP1 is the scheduling pressure for injection of fuel into cylinder number one, MR2 is the mass ratio for cylinder number two, RMS2 is the RMS fuel rail fuel pressure for injection of fuel into cylinder number two, SP2 is the scheduling pressure for injection of fuel into cylinder number two, MR3 is the mass ratio for cylinder number three, RMS3 is the RMS fuel rail fuel pressure for injection of fuel into cylinder number three, SP3 is the scheduling pressure for injection of fuel into cylinder number three, MR4 is the mass ratio for cylinder number four, RMS4 is the RMS fuel rail fuel pressure for injection of fuel into cylinder number four, SP4 is the scheduling pressure for injection of fuel into cylinder number four.

A numerical example for determining the mass ratios may be as follows:

$$MR1 = \sqrt{\frac{6.1}{6.05}} = 1.004 \quad MR2 = \sqrt{\frac{6.3}{6.15}} = 1.012$$

$$MR3 = \sqrt{\frac{5.8}{6.0}} = 0.983 \quad MR4 = \sqrt{\frac{5.9}{5.95}} = 0.996$$

The mass ratios may be also be referred to as the errors for the injected fuel amounts. Thus, for cylinder number one in this example, the amount of fuel injected may be 0.4% rich. For cylinder number two in this example, the amount of fuel injected may be 1.2% rich. For cylinder number three in this example, the amount of fuel injected may be 1.7% lean. For cylinder number four in this example, the amount of fuel injected may be 0.4% lean.

Method 500 may also determine the average of the errors in the amounts of fuel injected to the cylinders during the engine cycle. For example, using the previous numbers, the average error amount may be determined as: Ave_err= ((1.004+1.012+0.983+0.996)/4)=0.999, where Ave_err is the average fuel injection error for all engine cylinders as determined from RMS or average fuel rail pressures measured during injection of fuel to engine cylinders. Compensation factors for each cylinder may be determined according to zero sum gains (e.g., the gain or loss of fuel from each fuel injector is balanced with the gain or loss of fuel of the other fuel injectors) as follows:

$$CF1 = \frac{MR1}{Ave\_err} \quad CF2 = \frac{MR2}{Ave\_err} \quad CF3 = \frac{MR3}{Ave\_err}$$

$$CF4 = \frac{MR4}{Ave\_err}$$

where CF1 is the compensation factor for the injector that injects fuel to cylinder number one, CF2 is the compensation factor for the injector that injects fuel to cylinder number two, CF3 is the compensation factor for the injector that injects fuel to cylinder number three, and CF4 is the compensation factor for the injector that injects fuel to cylinder number 4. Method 500 stores the compensation factors for each fuel injector of each cylinder in controller random access memory. Method 500 proceeds to 510.

At 510, method 500 adjusts fuel injection timings to compensate for fuel pressure changes in the fuel rail. In one example, a fuel injection amount or mass for each engine cylinder is determined according to engine operating conditions including engine speed and driver demand torque. The fuel injection mass for each cylinder is multiplied by the compensation factor for that cylinder that was determined at 508. This modifies and generates a requested mass of fuel that is to be injected to the cylinder. The requested fuel mass is then converted into a fuel injector pulse width. The fuel injector pulse width may be determined via referencing or indexing a fuel injector transfer function that outputs a fuel injector pulse width according to the requested fuel mass. Method 500 proceeds to 512.

At 512, method 500 compares timing of commands to open and close the engine's fuel injectors with fuel pressures in the fuel rail as determined at 506. In one example, the time that a fuel injector is commanded open is subtracted from a time that fuel pressure in the fuel rail increases by more than a predetermined threshold amount after the fuel injector was most recently commanded open. For example, as shown in FIG. 3, time t1 may be subtracted from time t2 to determine a delay time between time t1 and time t2. Method 500 may also subtract a time that a fuel injector is commanded closed from a time that fuel pressure in the fuel rail increases by more than a predetermined threshold amount after the fuel injector was most recently commanded closed. For example, as shown in FIG. 3, time t3 may be subtracted from time t4 to determine a delay time between time t3 and time t4. Fuel injector opening time delays and fuel injector closing time delays may be determined for each cylinder in this way. Method 500 proceeds to 514.

At 514, method 500 judges if the fuel injector opening delay for a cylinder that was determined at 512 is greater than a threshold amount. Further, method 500 may also judge if the fuel injector closing delay for the cylinder that was determined at 512 is greater than a threshold amount. If so, the answer is yes and method 500 proceeds to 516. Otherwise, the answer is no and method 500 proceeds to exit.

At 516, method 500 indicates degradation for the fuel injector of the cylinder that was determined to be degraded at 514. Method 500 may indicate fuel injector degradation via a message displayed to a human/machine interface. Method 500 proceeds to 518.

At 518, method 500 attempts to mitigate effects of degradation of a fuel injector. In one example, method 500 may deactivate a degraded injector and cease injecting fuel via the fuel injector. Method 500 may activate a second fuel injector in the cylinder and inject fuel only via the second fuel injector when the first fuel injector is determined to be degraded. For example, if a port fuel injector of a cylinder is determined to be degraded, fuel may be injected only to the cylinder via a direct fuel injector. The port fuel injector may be deactivated until the vehicle is serviced.

In another example, method 500 may continue to operate the engine and the degraded fuel injector: however, method 500 may limit the amount of power that may be generated via the engine. Method 500 may also deactivate particular cylinder operating modes and operating ranges if desired. Method 500 proceeds to exit.

In this way, timing of fuel injectors and amounts of fuel being injected to an engine may be adjusted or compensated according to RMS or average pressures that may be observed when a fuel injector is open. The adjustments may reduce the possibility of cylinder to cylinder air-fuel maldistribution.

Thus, the method of FIG. 5 provides for a method for supplying fuel to an engine, comprising: each time fuel is injected to an engine during an engine cycle, sampling pressure in a fuel rail a plurality of times while a fuel injector supplying fuel to a cylinder via the fuel rail is open; and adjusting timing of a subsequent fuel injection in response to compensation factor that is generated from sampling pressure in the fuel rail the plurality of times. The method includes where the compensation factor is based on a ratio of pressures. The method includes where the ratio of pressures includes a root-mean-square fuel rail pressure in a numerator of the ratio of pressures. The method includes where the ratio of pressures includes a scheduled fuel rail pressure in a denominator of the ratio of pressures. The method includes where adjusting timing of the subsequent fuel injection increases or decreases an amount of fuel injected. The method further comprises not generating the compensation factor in response to a change in engine speed. The method further comprises not generating the compensation factor in response to a change in engine load.

The method of FIG. 5 also provides for a method for supplying fuel to an engine, comprising: adjusting timing of a plurality of fuel injections in response to a plurality of compensation factors that are based on an average of a plurality of pressure ratios, the plurality of pressure ratios including a pressure ratio for each engine cylinder. The method includes where the pressure ratio for each cylinder is based on pressures in a fuel rail while fuel is being injected. The method includes where the pressure ratio for each cylinder is further based on a scheduling fuel pressure. The method includes where the scheduling fuel pressure is a fuel pressure within a fuel rail at a time before adjusting timing of the plurality of fuel injections. The method further comprises determining a fuel injector opening delay or a fuel injector closing delay. The method includes where the fuel injector opening delay is determined as an amount of time between commanding a fuel injector open and a rise in fuel pressure within a fuel rail.

As will be appreciated by one of ordinary skill in the art, the method described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for supplying fuel to an engine, comprising:
   each time fuel is injected to an engine during an engine cycle, sampling pressure in a fuel rail a plurality of times while a fuel injector supplying fuel to a cylinder via the fuel rail is open; and
   adjusting timing of a subsequent fuel injection in response to a compensation factor that is generated from sampling pressure in the fuel rail the plurality of times.

2. The method of claim 1, where the compensation factor is based on a ratio of pressures, the ratio of pressures including a root mean square fuel rail pressure and a scheduled fuel rail pressure.

3. The method of claim 2, where the ratio of pressures includes a root-mean-square fuel rail pressure in a numerator of the ratio of pressures.

4. The method of claim 3, where the ratio of pressures includes the scheduled fuel rail pressure in a denominator of the ratio of pressures.

5. The method of claim 1, where adjusting timing of the subsequent fuel injection increases or decreases an amount of fuel injected.

6. The method of claim 1, further comprising not generating the compensation factor in response to a change in engine speed.

7. The method of claim 1, further comprising not generating the compensation factor in response to a change in engine load.

8. An engine system, comprising:
   a plurality of cylinders;
   a fuel rail;
   a plurality of fuel injectors in fluidic communication with the fuel rail and the plurality of cylinders; and
   a controller including executable instructions stored in a non-transitory memory that cause the controller to adjust timing of the plurality of fuel injectors in response to root-mean-square values of fuel pressures, each of the fuel pressures sampled only when one of the plurality of fuel injectors is open.

9. The engine system of claim 8, further comprising additional instructions that cause the controller to estimate a fuel injector opening delay based on the fuel pressures.

10. The engine system of claim 9, further comprising additional instructions that cause the controller to determine a presence or absence of fuel injector degradation in response to the fuel injector opening delay.

11. The engine system of claim 8, further comprising additional instructions that cause the controller to estimate a fuel injector closing delay based on the fuel pressures.

12. The engine system of claim 11, further comprising additional instructions that cause the controller to determine compensation factors based on the root-mean square values of fuel pressures.

13. The engine system of claim 12, where the compensation factors are based on a ratio of pressures.

14. The engine system of claim 13, where the ratio of pressures include a scheduling pressure.

15. A method for supplying fuel to an engine, comprising:
   adjusting timing of a plurality of fuel injections in response to a plurality of compensation factors that are based on an average of a plurality of pressure ratios, the plurality of pressure ratios including a pressure ratio for each engine cylinder.

16. The method of claim 15, where the pressure ratio for each cylinder is based on pressures in a fuel rail while fuel is being injected.

17. The method of claim 15, where the pressure ratio for each cylinder is further based on a scheduling fuel pressure.

18. The method of claim 17, where the scheduling fuel pressure is a fuel pressure within a fuel rail at a time before adjusting timing of the plurality of fuel injections.

19. The method of claim 15, further comprising determining a fuel injector opening delay or a fuel injector closing delay.

20. The method of claim 19, where the fuel injector opening delay is determined as an amount of time between commanding a fuel injector open and a rise in fuel pressure within a fuel rail.

\* \* \* \* \*